United States Patent [19]

Dunn et al.

[11] 3,783,385

[45] Jan. 1, 1974

[54] DIGITAL DIVERSITY COMBINER

[75] Inventors: James G. Dunn, Montclair, N.J.; John R. Cowan, Brooklyn; Anthony J. Russo, Richmond Hills, both of N.Y.

[73] Assignee: International Telephone and Telegraph Corporation, Nutley, N.J.

[22] Filed: Nov. 28, 1972

[21] Appl. No.: 310,192

[52] U.S. Cl. .................. 325/305, 178/88, 325/307, 325/324, 325/326

[51] Int. Cl. .................. H04b 1/06

[58] Field of Search .................. 178/67, 88; 325/56, 325/60, 30, 320, 301, 324, 305–307, 326, 399

[56] References Cited

UNITED STATES PATENTS 3,646,448 2/1972 Harmon et al. .................. 325/326

*Primary Examiner*—Albert J. Mayer
*Attorney*—C. Cornell Remsen, Jr. et al. and Alfred C. Hill

[57] ABSTRACT

This relates to a predetection maximal ratio digital diversity combiner for a phase shift keyed digital data signal propagating on N different paths through a dispersive medium, where N is an integer greater than one. Each of N signal channels respond to the data signal propagated on a different one of the N different paths. Each of the channels include an arrangement to separate the data signal into an inphase component and a quadrature component and also a pair of analog-to-digital converters to convert the inphase component into an inphase digital signal and the quadrature component into a quadrature digital signal. A digital adder arrangement is coupled in common to the output of each of the N channels to digitally add the inphase digital signal of each of the channels together to produce a combined inphase digital signal and to digitally add the quadrature digital signals of each of the channels together to produce a combined quadrature digital signal. A decision circuit responds to the most significant digit of both the combined inphase digital signal and the combined quadrature digital signal to recover the data conveyed by the data signal. A clock recovery circuit responds to the combined inphase digital signal, the combined quadrature digital signal and the recovered data to produce properly phased timing signals for control of the decision logic, each of the analog-to-digital converters and an automatic gain control circuit common to each of the N channels. Each of the channels further include an arrangement coupled between the associated pair of analog-to-digital converters and the digital adder arrangement and also to the decision circuit. This arrangement is responsive to the recovered data and the inphase and quadrature digital signals to determine the maximal ratio weights of these signals. The determined inphase and quadrature digital weight signals are employed to weight the inphase digital signal and the quadrature digital signal prior to digitally adding thereof in the adder arrangement. An automatic gain control circuit is coupled to the last mentioned arrangement of each of the channels and to the clock recovery circuit to produce an automatic gain control signal to control the gain of the data signal in each of the channels. This is accomplished by detecting the maximum maximal ratio weight of either the inphase or quadrature digital signal of any of the channels involved in the diversity combiner and generating from this maximum maximal ratio weight an automatic gain control voltage.

17 Claims, 20 Drawing Figures

AOI = AND GATES COUPLED TO AN OR GATE COUPLED TO AN INVERTER

AOI = AND GATES COUPLED TO AN OR GATE COUPLED TO AN INVERTER

DIGITAL DIVERSITY COMBINER

BACKGROUND OF THE INVENTION

This invention relates to radio receiving systems of the space or angle diversity type responsive to angularly modulated carrier waves, such as phase shift keyed (PSK) carrier waves, and more particularly to a predetection maximal ratio diversity combiner for such diversity radio receiving systems.

One of the difficulties encountered by radio systems for long distance communications is that of fading, generally regarded as resulting from the interference at the receiver between those transmitted radio frequency (RF) radio waves which have followed paths of different effective lengths. Heretofore, this phase difficulty has been attacked by various forms of diversity systems, such as space diversity, frequency diversity, time diversity and angle diversity systems.

Diversity has achieved widespread success especially with present day long distance tropospheric scatter communication systems. Because of the weak, rapidly fading signals inherent in tropospheric scatter communication systems, these systems employ modulation techniques that provide a signal-to-noise enhancement, such as obtainable with angular modulation techniques, in conjunction with diversity reception to provide high quality, reliable communication. One technique for receiving angularly modulated signals in a diversity receiver has been termed "signal selection" technique. With this technique, the stronger of the two signals is accepted and the weaker of the two signals is rejected. It was found that this technique did not provide as much of an advantage as compared to predetection combining techniques, where both of the channels of a dual diversity system, or all of the channels of a multiple diversity receiving system, contribute to the combined IF (intermediate frequency) frequency signal output resulting in an advantage in long distance tropospheric scatter communication systems.

One form of IF predetection combined systems has beed called an "equal gain combining" system. In this system the IF signals are generated to have equal frequencies and to have a phase relationship so that the IF signals can be combined in phase and at the same relative level they are received. The output of the combiner, the common IF signal, is utilized to generate an automatic gain control (AGC) which is applied in common to the IF amplifiers of the diversity receiver to assure a constant amplitude, common IF signal at the output of the combiner.

Still another form of predetection combining system is called the "maximal ratio" or "ratio squared" combining system which is the most effective diversity combining system affording the greatest potential in signal reception reliability. This combining technique is similar to equal gain combining except for the method of controlling the gain for each predetected IF signal. Equal gain combining requires that the relative gain for each predetected IF signal be the same, whereas maximal ratio combining requires that the gain for each predetected IF signal be proportional to the received signal level itself. In the resultant common IF output the weaker signal is controlled to contribute a proportionally smaller amount of itself than does the stronger signal of the combined signal. The common AGC voltage of the equal gain combining technique is still employed in the maximal ratio combining arrangement to maintain the amplitude of the combined IF output signal constant.

The primary advantage of predetection combining technique is to increase the probability receiver threshold is exceeded for a greater percentage of the time, thereby improving communication reliability.

In predetection combining systems of the prior art, whether it be equal gain combining or maximal ratio combining, it is necessary to provide phased locked loops and voltage controlled crystal oscillators or narrow band crystal filters to insure the proper phase relationship of the IF signals prior to combining so that these signals may be combined in phase. Also all the circuitry in the predetection combiners of the prior art whether directed to equal gain combining or maximal ratio combining have in the past employed analog circuitry throughout.

SUMMARY OF THE INVENTION

An object of the present invention is to provide a predetection maximal ratio digital diversity combiner for a PSK digital data signal propagating on a plurality of different paths through a dispersive medium.

Another object of the present invention is to provide a predetection maximal ratio digital diversity combiner which reduces manufacturing costs by eliminating expensive items, such as phased locked loops, voltage controlled crystal oscillators, crystal filters and tuning adjustments associated with IF bandpass filters.

Still another object of the present invention is to provide a digital diversity combiner for a PSK digital data signal capable of being employed in a space or angle diversity communication system.

A feature of the present invention is the provision of a predetection maximal ratio digital diversity combiner for a PSK digital data signal propagating on N different paths through a dispersive medium, where N is an integer greater than one, comprising: N signal channels, each of the channels responding to the data signal propagating on a different one of the N different paths; each of the channels including first means to separate the data signal into an inphase component and a quadrature component, and second means coupled to the first means to convert the inphase component into an inphase digital signal and the quadrature component into a quadrature digital signal; third means coupled in common to the output of each of the channels to digitally add the inphase digital signal of each of the channels together to produce a combined inphase digital signal and to digitally add the quadrature digital signal of each of the channels together to produce a combined quadrature digital signal; fourth means coupled to the third means responsive to the combined inphase digital signal and the combined quadrature digital signal to recover data conveyed by the data signal; each of the channels further including fifth means coupled between the second means and the third means and to the fourth means responsive to the recovered data to weight the inphase digital signal and the quadrature digital signal prior to digitally adding thereof in the third means; and sixth means coupled to the fifth means of each of the channels to produce an automatic gain control signal for control of the gain of the data signal in each of the channels.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

For purposes of explanation the PSK modulation employed in conjunction with the predetection maximal ratio digital diversity combiner of the present invention is a MSK (minimum shift keyed) type of PSK modulation. The predetection maximal ratio digital diversity combiner of this invention is also capable of operation with a BPSK (binary phase shift keyed) type of PSK system, a QPSK (quaternary phase shift keyed) type phase shift signal or a staggered clock QPSK type PSK modulation.

The MSK type PSK modulation is produced in a modulator, not shown, where there are four-phase signals generated by varying the amplitudes of two carriers at the same frequency, but in quadrature, according to the binary input data to obtain the proper output phase. The amplitude of the inphase carrier is varied as a cosinusoid, and the amplitude of the quadrature carrier is varied as a sinusoid. Since each amplitude is 90° out-of-phase with the other and changes sinusoidally, the magnitude of their sum will remain constant.

Consider modulation with an arbitrary input of binary input data. In an FM (frequency modulation) system, the carrier must be made to change between two frequencies, one corresponding to a mark or binary "1" and the other frequency corresponding to a space or binary "0". In a PSK system whose phase is the integral of the frequency, the phase of the carrier decreases 90° for each binary 0 and increases 90° for a binary 1. This is done by modulating an inphase and quadrature carrier with the cosine of the phase and the sine of the phase, respectively. Phase modulation in this manner amounts to nothing more than AM (amplitude modulator) waves in quadrature. The magnitude of the vector sum of the amplitudes of the two waves will be constant.

The cosine pulses can be approximated by shaping rectangular pulses produced by the logic circuitry with the proper low pass filter. However, the sharp transitions between the two pulses cannot be maintained. This will give rise to an amplitude variation, the extent of which will depend on how well the filter response approximates a sinusoid, which in turn depends on the transfer function and bandwidth of the filter and upon the width and height of the pulse.

After modulation, as described hereinabove, the MSK signal is transmitted at a proper RF frequency toward the troposphere, or some other dispersive medium, and due to the dispersive action of this medium there will be developed N different paths over which the MSK digital data signal is propagated, where N is an integer greater than one.

Figure 1:
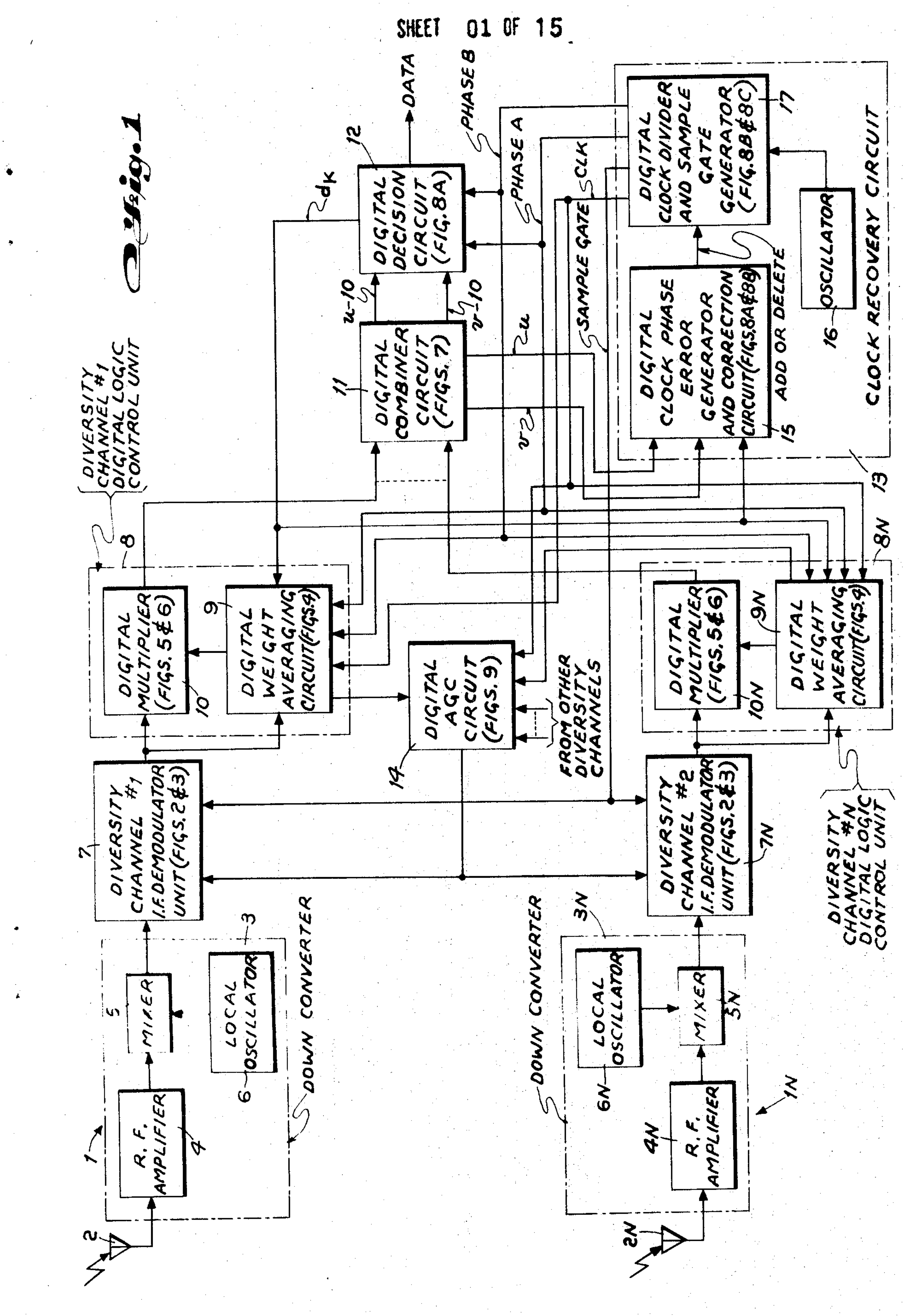
FIG. 1 illustrates a block diagram of a digital diversity combiner in accordance with the principles of the present invention.

Referring to FIG. 1, there is disclosed therein a diversity receiver having 1-1N signal channels each of which responds to the data signal propagated on a different one of the N paths. Each of the signal channels incorporates an antenna 2 which receives the data signal from its associated one of the N paths. The antenna provides a signal to a down-converter 3 which includes, for instance, an RF amplifier 4, a mixer 5 and a local oscillator 6. The purpose of the down- converter 3 in each of the signal channels is to convert the RF signal conveying data in MSK type modulation form to a suitable IF frequency, for instance, 70 megahertz (MHz) modulated exactly like the RF signal.

The output of the down-converters in each of the signal channels is then coupled to the predetection maximal ratio digital diversity combiner in accordance with the principles of the present invention. Each of the signal channels includes a diversity channel IF demodulator unit 7 which converts the received IF signal to a digital form and a digital logic control unit 8. Unit 8 is completely digital and performs the key functions of determining the maximal ratio weights in the digital weight averaging circuit 9 and of weighting the digital signal at the output unit 7 according to the determind weight values in the digital multiplier 10. Common to the output of unit 8 is the digital combiner circuit 11, the digital decision circuit 12, the clock recovery circuit 13 and the digital AGC circuit 14. Combiner circuit 11 sums the weighted signal outputs of each of the channel units 8. The outputs of channel units 8 are simply added in pairs until all channels are combined. The decision circuit 12 detects the transmitted binary data from the combined outputs of circuit 11.

The primary purpose of the AGC circuit 14 is to keep the strongest signals within the operating range of the analog-to-digital converters in the channel demodulator units 7. A common AGC bus voltage, which is applied to all IF amplifiers, is determined by the maximum of the maximal ratio weights determined in all the units 8.

Clock recovery circuit 13 applies clock phase corrections in steps of 1/32 of a bit interval whenever the combined signal is strong enough to accurately determine clock phase error. This approach bridges fades of ten seconds or more duration without loss of bit integrity.

Let the transmitted signal be denoted by the vector s. The unmodulated value of s is equal to one. Since each diversity channel causes a arbitrary amplitude and phase variation, there is no point in assuming a more general value then unity for the unmodulated transmitted carrier. The following table indicates the values assumed by s as a function of type type of modulation.

| Modulation Type | Values of $s$ Clock Phase A | Clock Phase B | Without reference to clock phase |
|---|---|---|---|
| MSK | ±1 | ±$j$ | |
| BPSK | | | ±1 |
| QPSK | | | ±1, ±$j$ |
| Staggered clock QPSK | ±1,±$j$ | ±1, ±$j$ | |

Let it be assumed the vector $a_1$ and $a_2$ represent the received signals on two diversity channels when the transmitted signal is unmodulated. These vectors have arbitrary amplitudes and phase which change slowly as the troposphere or dispersive medium changes. Noise vectors $n_1$ and $n_2$ are received in addition to the received signals. Thus, $A_1 = a_1 s + n_1$ $A_2 = a_2 s + n_2$ are the complete received signals including fading, modulation and noise.

The maximal ratio combiner principle is to add these signals weighted by the maximal ratio weights $w_1$ and $w_2$ resulting in the combined signal $r = w_1 A_1 + w_2 A_2$, where $w_1$ and $w_2$ are the complex conjugate values of $a_1$ and $a_2$.

Thus, the combiner, in accordance with the principles of the present invention, measures $a_1$ and $a_2$, computes $w_1$ and $w_2$, weights $A_1$ and $A_2$ by $w_1$ and $w_2$ and combines the resultant signals to provide the combined signal $r$. For the moment assume the signal is not modulated, i.e., $s = 1$. Then $a_1$ and $a_2$ are easily measured by averaging $A_1$ and $A_2$ over a long enough period to make the noise contribution negligible. Denote this linear averaging operation by E. This is implemented by passing the signal through a digital low pass filter.

$E\,(a_1 + n_1) = a_1 + E_{n1} = a_1$ when the $E_{n1}$ term is equal to 0.

Thus, the output of the weight averaging circuit 9 is the conjugate of this average.

The effect of modulation is to "hop" the received signal to one of two phases for BPSK and one of four phases for MSK and QPSK. If the signal is "dehopped" before averaging, there is provided the equivalent of an unmodulated received signal. The dehopping or compensation for carrier phase shift modulation is accomplished by using the result of the output of the decision circuit 12 which should be the same as s except for occasional errors. These errors will have a negligible effect on the weight average if a long enough averaging time is used.

Thus, the maximal ratio weights are computed by the rule $w_1 = E\,\overline{A}_1\, s$ $w_2 = E\,\overline{A}_2\, s$, where $\overline{A}_1$ and $\overline{A}_2$ are complex conjugates.

The clock recovery circuit 13 includes a digital clock phase error generator and correction circuit 15, an oscillator 16 operating at 32 times the IF frequency and a digital clock divider and sample gate generator 17 which has a pulse added or deleted by circuit 15 to establish the proper phase for the clock CLK and the other timing signals generated thereby, such as the phase A, phase B and sample gate timing signals.

Figure 2:
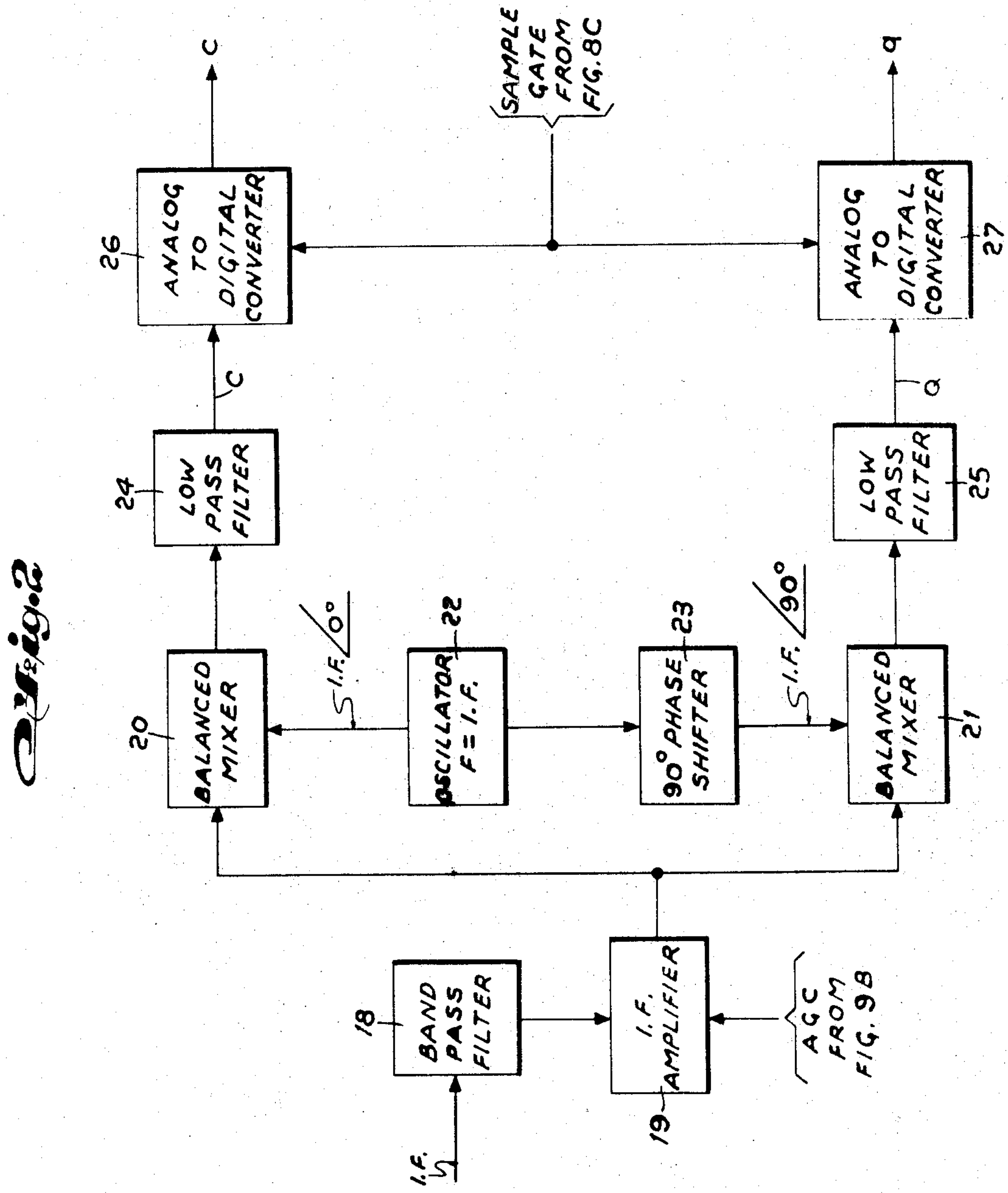
FIG. 2 illustrates a block diagram of one IF demodulator unit of FIG. 1.

Referring to FIG. 2, there is disclosed therein in block diagram form circuitry incorporated in demodulator unit 7 of FIG. 1. The output of down-converter 3 in each channel is coupled to a bandpass filter 18 and, hence, to an IF amplifier 19 who receives an AGC control voltage from AGC circuit 14. The output of amplifier 19 is coupled to a balanced mixer 20 and a balanced mixer 21. The output of a fixed IF carrier reference oscillator 22 is coupled directly to balanced mixer 20 and through a 90° phase shifter 23 to balanced mixer 21. The resultant output of mixers 20 and 21 are passed through low-pass filters 24 and 25, respectively, where filters 24 and 25 have an impulse response matched to the demodulated incoming signal. The output signal of filters 24 and 25 are then coupled, respectively, to analog-to-digital converters 26 and 27 which receives a sample gate from clock recovery circuit 13 to sample the results of the conversion in converters 26 and 27 at the bit rate. The output of converter 26 is the inphase component of the received signal in digital form and the output of converter 27 is the quadrature component of the received signal in digital form. Thus, output c from converter 26 is the inphase digital signal and the output q from converter 27 is the quadrature digital signal.

The rule for computing the max ratio weights were described above in terms of complex arithmetic operations. The actual combiner operations involved only real quantities. The design equations pertaining to the digital combiner of the present invention are given in terms of the real quantities defined as:

(1) $s = a + ib$ (2a) $a_j = x_j - iy_j$ (2b) $A_j = c_j + iq_j$

Then (2c) $w_j = x_j + iy_j = E\,\overline{A}_j\, s$ (2d) $= E\,(c_j - iq_j)\,(a + ib)$ (2e) $= E\,(ac_j + bq_j) + i\,E\,(bc_j - aq_j)$.

equating real and imaginary parts of both sides of the above equation gives (3) $x_j = E(c_j a + q_j b)$ (4) $y_j = E(c_j b - q_j a)$, where $x_j$ is the inphase digital weight signal, $y_j$ is the quadrature digital weight signal, $c_j$ is the inphase digital signal at the output of converter 26 and $q_j$ is the quadrature digital signal at the output of converter 27, $s$ is a modulating signal, $a$ and $b$ are the three level outputs of the encoder and E indicates an averaging process. The demodulator 7 outputs $c_j$ and $q_j$ may be weighted as follows:

(5) $U_j = c_j x_j - q_j y_j$ (6) $V_j = c_j y_j + q_j x_j$, where $U_j$ is the inphase weighted digital signal and $V_j$ is the quadrature weighted digital signal. The resulted corrected outputs are summed in circuit 11 to produce the combined inphase digital signal $U_j$ and the combined digital signal $V_j$. These combined digital signals are sampled at alternate phase of the data rate clock to recover the transmitted data. The recovered data is then given by (7) $a = \text{sign}\ \Sigma_j u_j$ at clock Phase A $= 0$ at clock Phase B (8) $b = \text{sign}\ \Sigma_j v_j$ at clock Phase B $= 0$ at clock Phase A Clock phasing errors may be determined by measurements made on the $u_j$ and $v_j$ sums. The phase error voltage is given by:

(9) $Er = \sin (C_o \Delta t)$ $= v^{(k+1)}$ at Phase A for sign $v^k \neq$ sign $v^{(k+2)}$ $= u^{(k+2)}$ at Phase B for sign $u^{(k+1)} \neq$ sign $u^{(k+3)}$ where $C_o$ is equal to the received signal amplitude, $\Delta t$ is equal to phase offset, and $k$ is an index on the data bits, $k = 0, 1, 2, \ldots$.

It is observed from equations (1) and (2) that $x_j$ and $y_j$ are in effect measurements of the signal amplitude. An AGC voltage for IF amplifiers 19 (FIG. 2) will, therefore, be a function of the maximum weight and is given by the equation

(10) AGC = function [ $|\max (x_j, y_j)|$ ]

Figure 10:
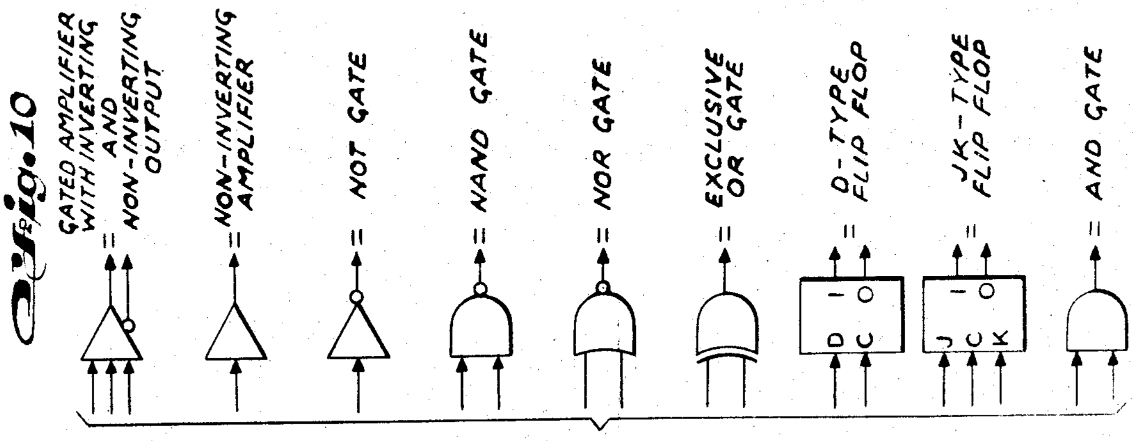
FIG. 10 defines the logic symbols employed in the logic diagrams of FIGS. 3 through 9.

Thee is described hereinbelow one embodiment of an implementation of various blocks of FIG. 1 starting from the analog-to-digital converters 26 and 27 of FIG. 2 and including the following blocks in the system of FIG. 1. Details of these blocks are illustrated in FIGS. 3–9 and include therein logic circuitry of one form that may be employed to implement the digital diversity combiner of the present invention and employs therein certain logic symbols which are illustrated and defined in FIG. 10 of the present application.

Figure 3:
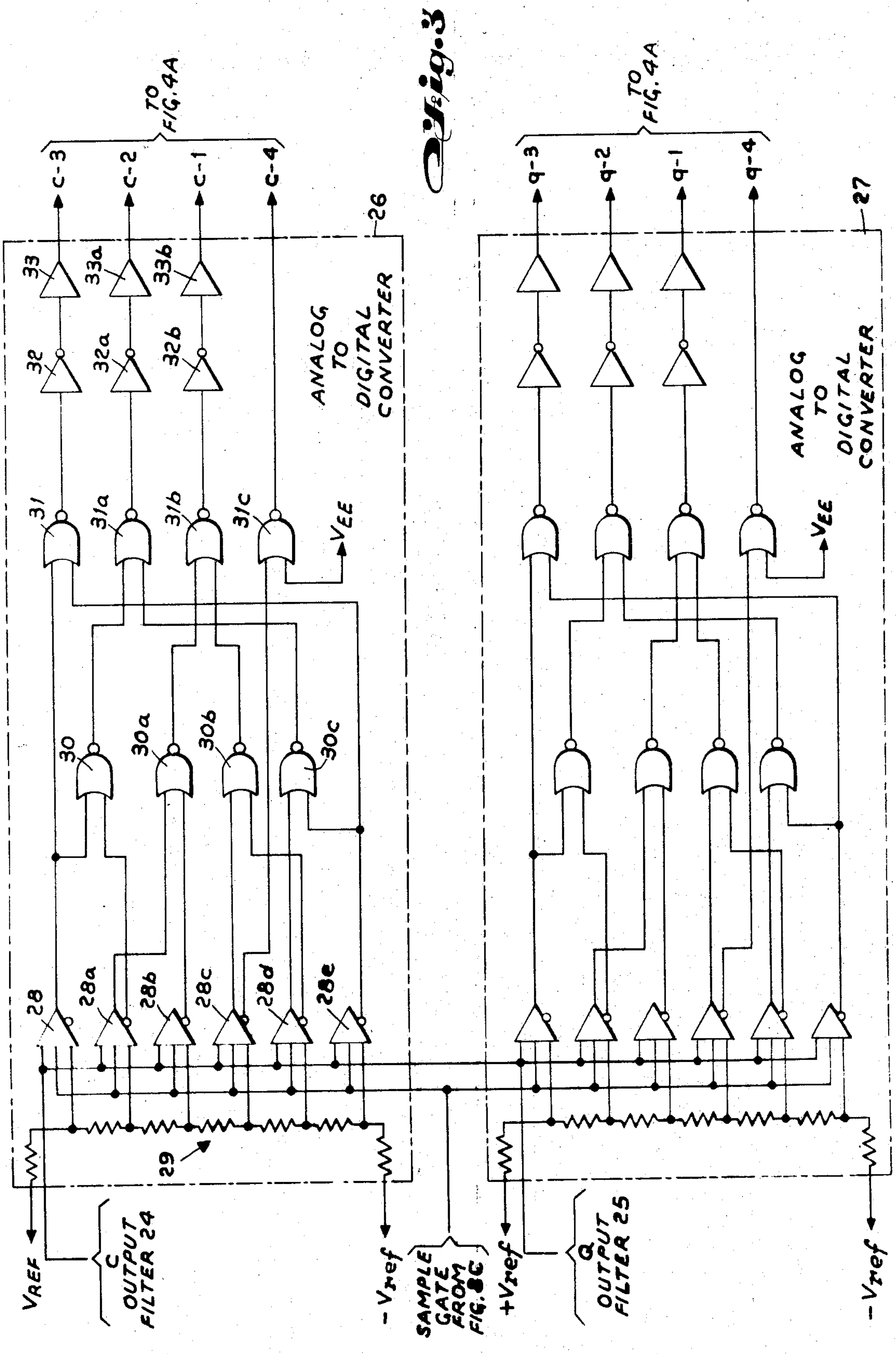
FIG. 3 illustrates the logic diagram of one embodiment of the analog-to-digital converters of FIG. 2.

Referring to FIG. 3, there is illustrated therein one embodiment of the logic diagram for analog-to-digital converters 26 and 27 (FIG. 2). Converter 26 receives the inphase component C at the output of filter 24 and converter 27 receives the quadrature component Q at the output of filter 25. Each of converters 26 and 27 include the same components and thus only converter 26 will be discussed. A parallel bank of voltage comparators including gated amplifiers 28 are coupled in parallel to the output of filter 24 and also to bias voltages provided by the voltage divider 29. These amplifiers 28 are gated on at the appropriate time by the sample gate from FIG. 8C, discussed hereinbelow, which forms a part of clock recovery circuit 13. The use of gated amplifiers 28 gated by the sampling gate eliminates the need for separate sample and hold circuitry. NOR gates **30–30*c* and 31–31*c* are coupled to the inverting and non-inverting output of amplifiers 28 to code the input signal according to those amplifiers having their bias exceeded to provide a four bit output through NOT gates 32–32*b* and non-inverting amplifiers 33–33*b*. The outputs from non-inverting amplifiers 33–33*b* represent the magnitude of the input C and the output from NOR gate 31*c*** is the sign bit resulting in a four bit sign magnitude representation of the analog input C having all allowable output states corresponding to 0, ±1, ±2, ±4, The bits of the inphase digital signal *c* are indicated as $c - 1$, $c - 2$, $c - 3$ and $c - 4$ where as mentioned above bit $c - 4$ is the most significant bit and, hence, the sign bit. The digital logic circuitry of FIG. 3 may employ Motorola emitted coupled logic components as described in the Motorola Integrated Circuit Catalog "MECL 1,600 and 1,000 Series."

Figures 4A, 4D:
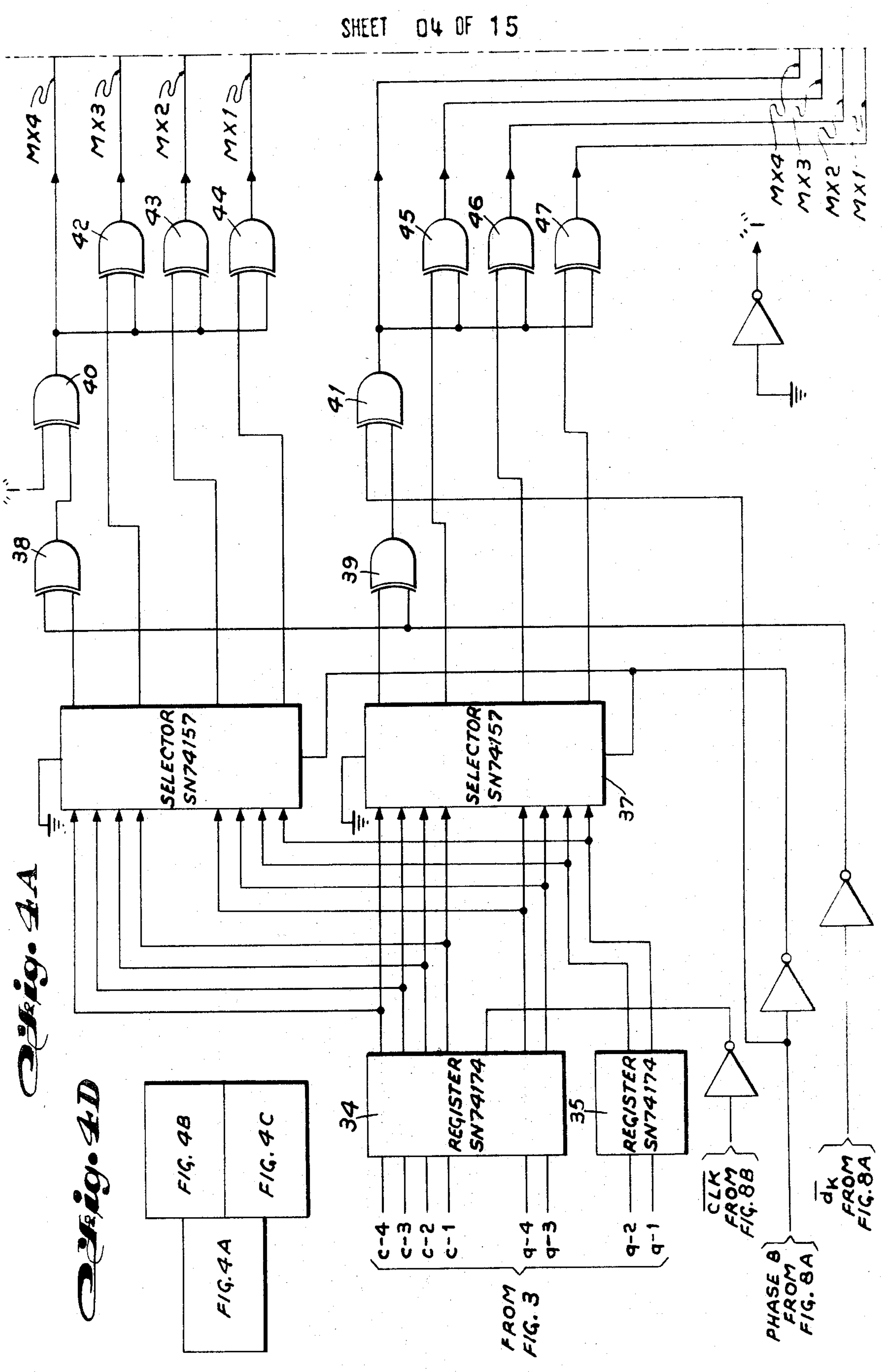
FIGS. 4A, 4B and 4C, when organized as illustrated in FIG. 4D, illustrates the logic diagram of one embodiment of the weight averaging circuit for one digital logic control unit of FIG. 1.
Figure 4B:
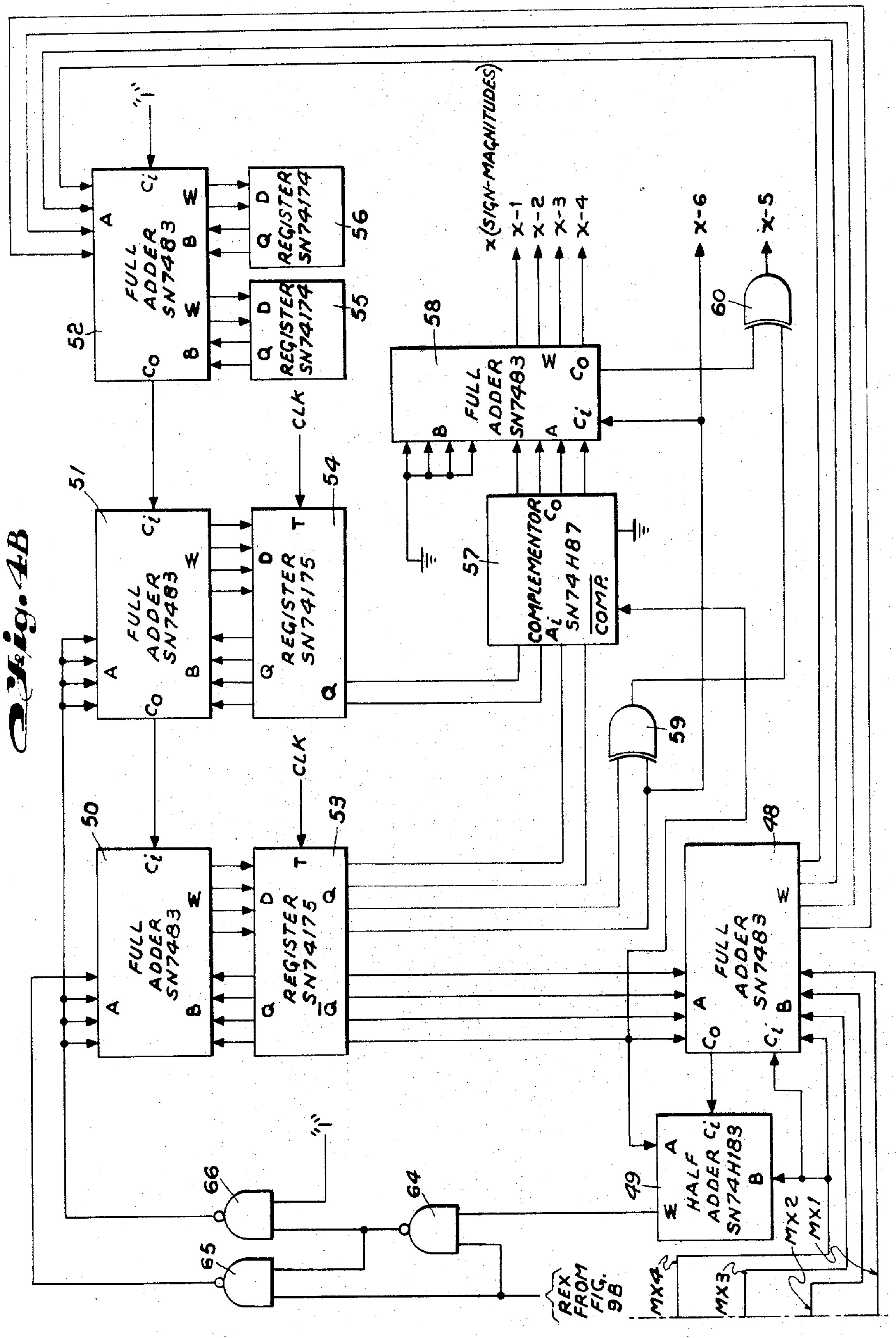
Figure 4C:
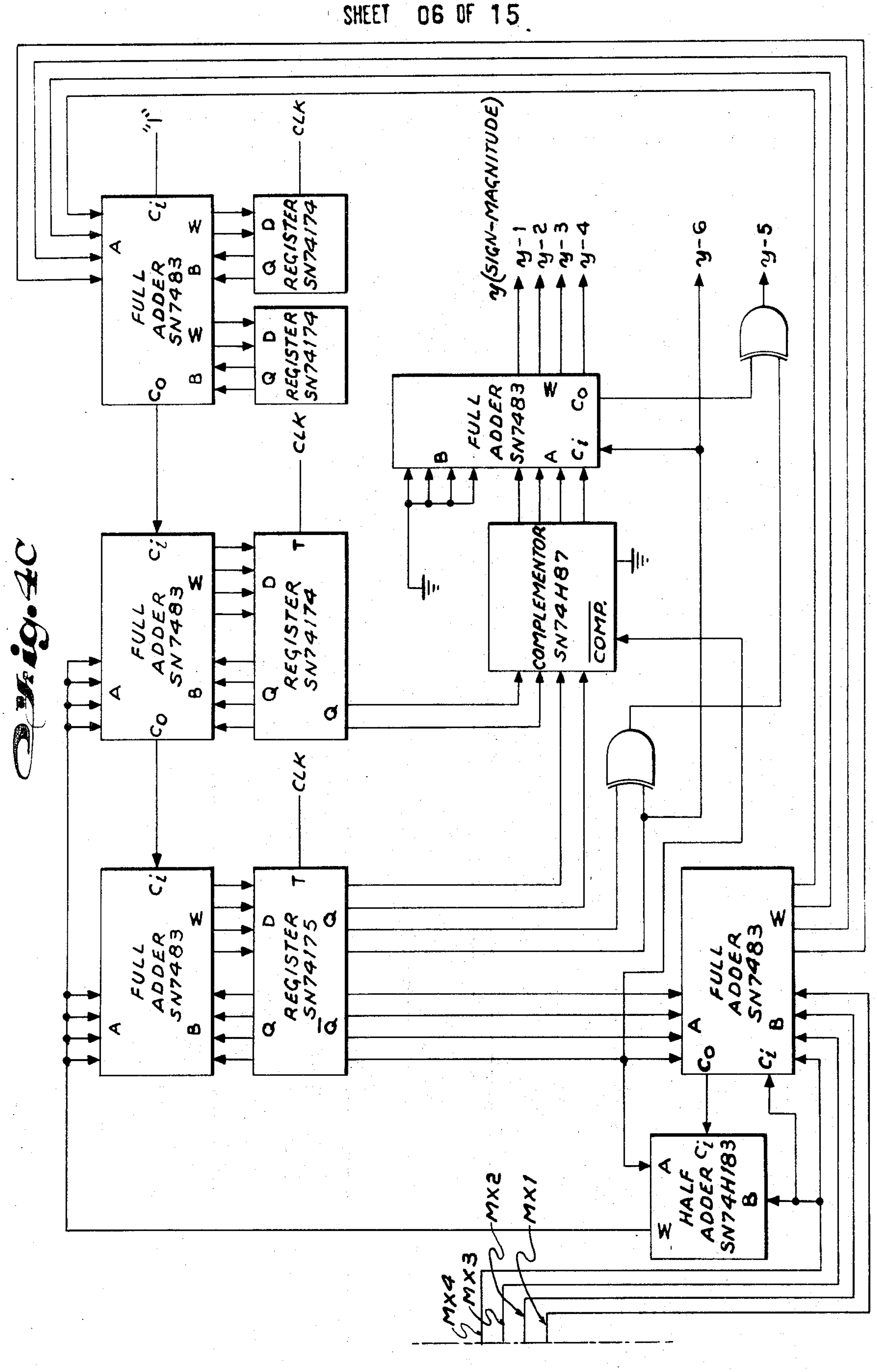

Referring to FIGS. 4A–4C, when organized as illustrated in FIG. 4D, illustrates one embodiment of the logic diagram of the weight averaging circuit 8 of FIG. 1.

The inphase digital signal *c*, as previously defined in equation (1), and the quadrature digital signal *q*, as previously defined in equation (2), at the output of converters 26 and 27, respectively, are coupled to registers 34 and 35. Registers 34 and 35 are under control of the timing clock signal CLK. The output from registers 34 and 35 are coupled to selectors 36 and 37 which are under control of the timing signal phase A. The selected outputs from selectors 36 and 37 are coupled to EXCLUSIVE OR gates 38–47. Gates 38 and 39 are under control of the $d_k$ data output of decision circuit 12, gate 41 is under control of the timing signal phase B, gates 42–44 are under control of the output of gate 40 and gates 45–47 are under control of the output of gate 41. These EXCLUSIVE OR gates in effect are complementers which provide the true value or complement value of the inphase and quadrature digital signals *c* and *q*. These gates are under control of the data $d_k$ to dehop or compensate the carrier shift present in the output of the converters 26 and 27 due to the MSK modulation.

As mentioned hereinabove the PSK modulation may be a BPSK, a QPSK or a staggered clock QPSK modulation rather than the preferred MSK modulation. When these alternate PSK modulations are employed the dehopping logic circuitry of FIG. 4A will have to be altered according to which one of the alternate PSK modulations are being employed to be compatible therewith.

The MX outputs of gates 40 and 42–44 are coupled to full adder 48 and half adder 49. The addition carried on by adder circuits is module-2 addition. Full adders 50–52 and registers 53–56 form a sixteen bit summing and accumulator circuit interconnected with full adder 48 and half adder 49 as illustrated together with the complementer 57, full adder 58, EXCLUSIVE OR gates 59 and 60 to produce the inphase digital weight signal *x* which is a sign-magnitude digital signal, where the significant bit *x*-6 gives the sign of the inphase digital weight signal and the digits *x*-1 to *x*-5 gives the magnitude of the inphase digital weight signal. The circuit just described briefly is an averaging circuit and produces the digital weight signal *x*, as previously defined in equation (3), to provide a maximal ratio weight which may be used to weight the inphase and quadrature digital signals c and q. In a similar manner and using identical equipment, as fully illustrated in FIG. 4C, the quadrature digital weight signal y, as previously defined in equation (4), which also is a sign-magnitude signal, is produced.

There is a condition in the operation of the digital combiner of the present invention where the x and y inphase and quadrature digital weight signals may be all binary 0 and the averaging circuits of FIGS. 4B and 4C cannot be started. This condition is detected in the AGC circuit as illustrated in FIG. 9B by NAND gate 61, NOR gate 62, and NAND gate 63 to produce a REX output when the condition is present where x and y are all binary 0s. In this instance, the REX signal is coupled to NAND gates 64–66 to set *x* to all binary 1s.

Figure 5:
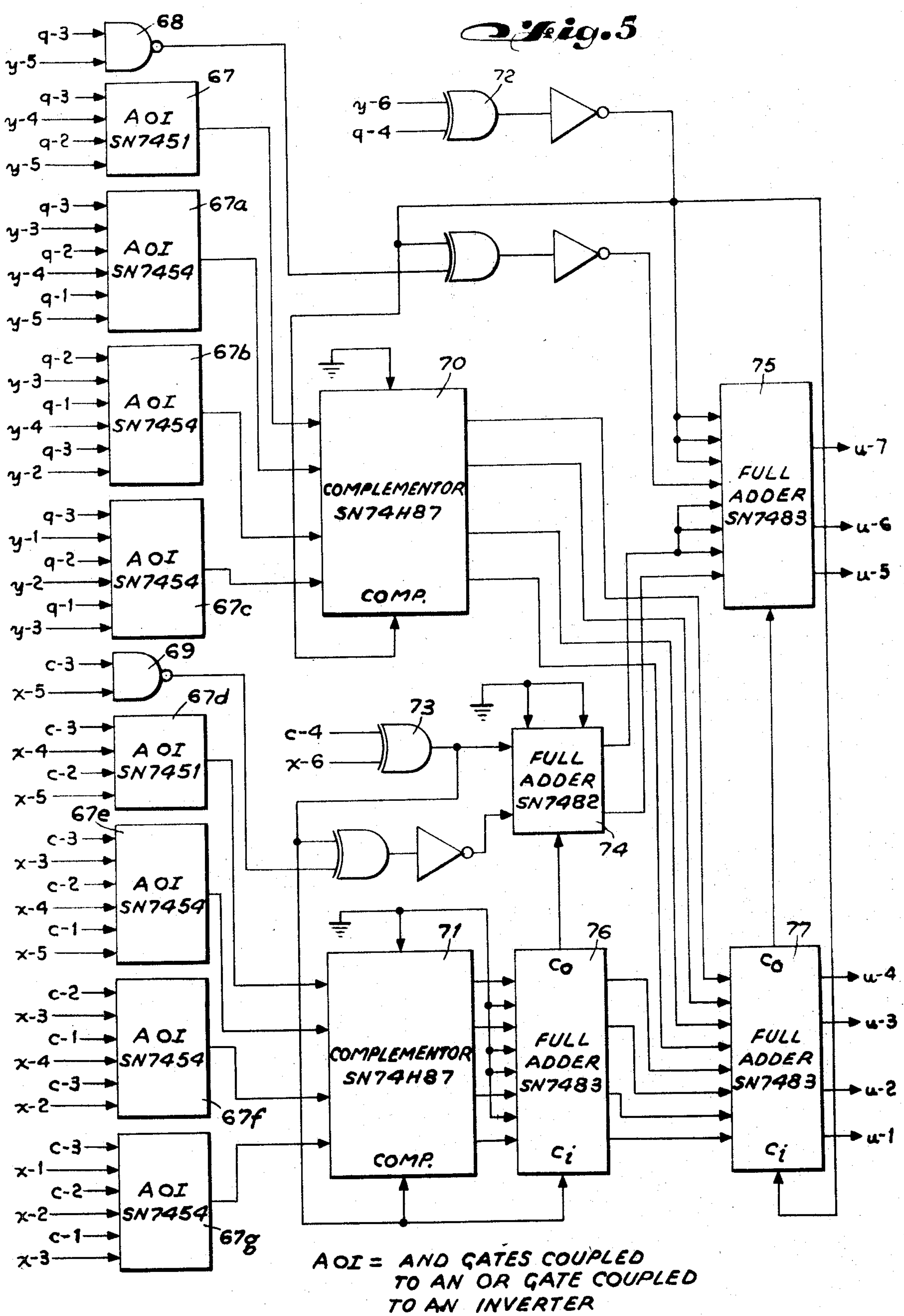
FIGS. 5 and 6 illustrate the logic diagram of one embodiment of the multiplier employed in one digital control unit of FIG. 1.
Figure 6:
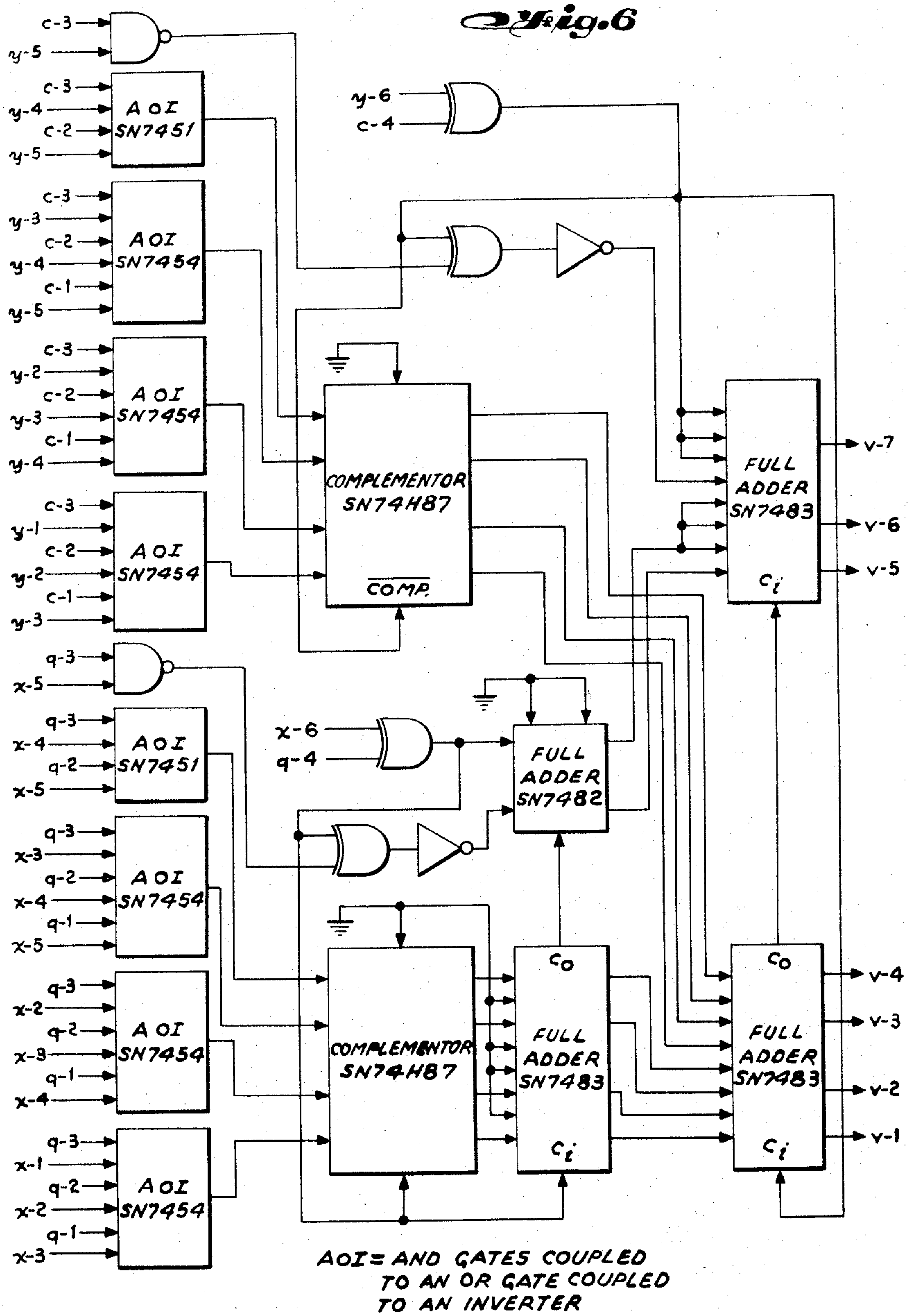

Referring to FIGS. 5 and 6, there is disclosed therein one embodiment of the logic circuit for digital multiplier 10 (FIG. 1). As illustrated in these figures the inphase digital weight signal *x*, the quadrature digital weight signal *y*, the inphase digital signal C and the quadrature digital signal *q* have their bits multiplied together in a first predetermined pattern as illustrated in FIG. 5 to produce the inphase weighted digital signal U, as previously defined in equation (5), and in a second predetermined pattern as illustrated in FIG. 6 to produce the quadrature weighted digital signal V, as previously defined in equation (6). The multiplication of the bits of the four signals in either the first or second pattern is accomplished in AOI circuits 67–67g and NAND gates 68 and 69. The AOI circuit is nothing more than AND gates combining the bits in pairs and then passing the resultant output of the AND gates through an OR gate whose output is then passed through NOT gate or inverter. The output from the AOI circuits 67–67c are coupled to complementer 70 and the outputs of the AOI circuits 67d–67g are coupled to complementer 71. Complementer 70 are under control of the most significant bits of the y and q signals, as compared in EXCLUSIVE OR gate 72, the complementer 71 is under control of the most significant bits of the x and c signals, as compared in EXCLUSIVE OR gate 73. The remaining circuits include full adders 74, 75, 76 and 77 which receive their inputs as illustrated to produce the inphase weighted digital signal U for application to the combiner circuit 11 (FIG. 1). The resultant weighted digital signal is a sign-magnitude signal with the most significant bit U-7 indicating the sign and the bits U-1 through U-6 indicating the magnitude of the inphase weighted digital signal.

With reference to FIG. 6, the circuitry is identical to FIG. 5 but operates on the bits of the *c*, *q*, *y* and *x* signals in a pattern different than the one in FIG. 5 to produce the quadrature digital weighted signal V which again is a sign-magnitude signal, where V-7 represents the sign and the bits V-1 through V-6 represent the magnitude.

Figure 7A:
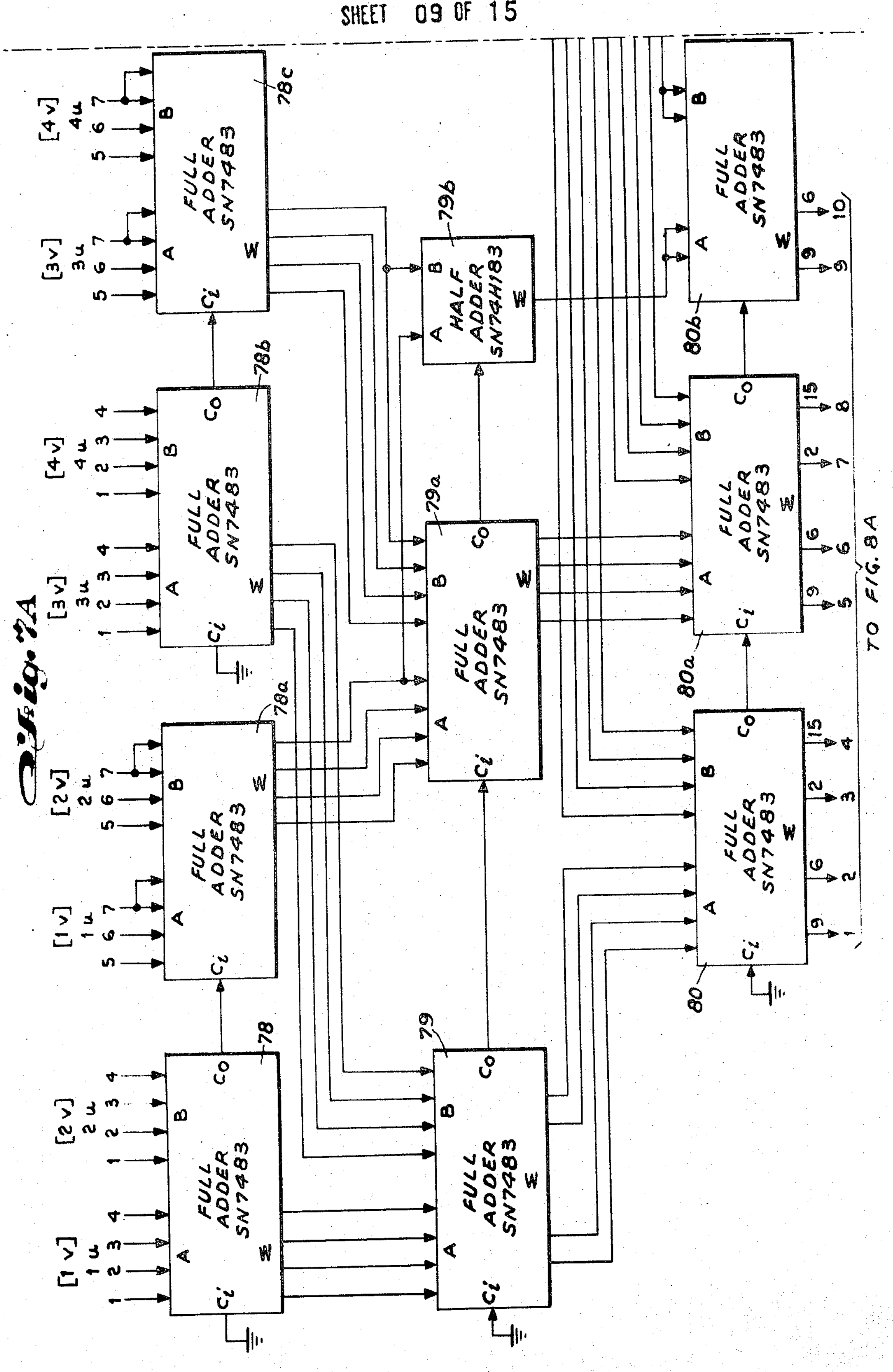
FIGS. 7A and 7B, when organized as illustrated in FIG. 7C, illustrates the logic diagram of one embodiment of the digital combiner circuit of FIG. 1 for eight folds or channels of diversity.
Figures 7B, 7C:
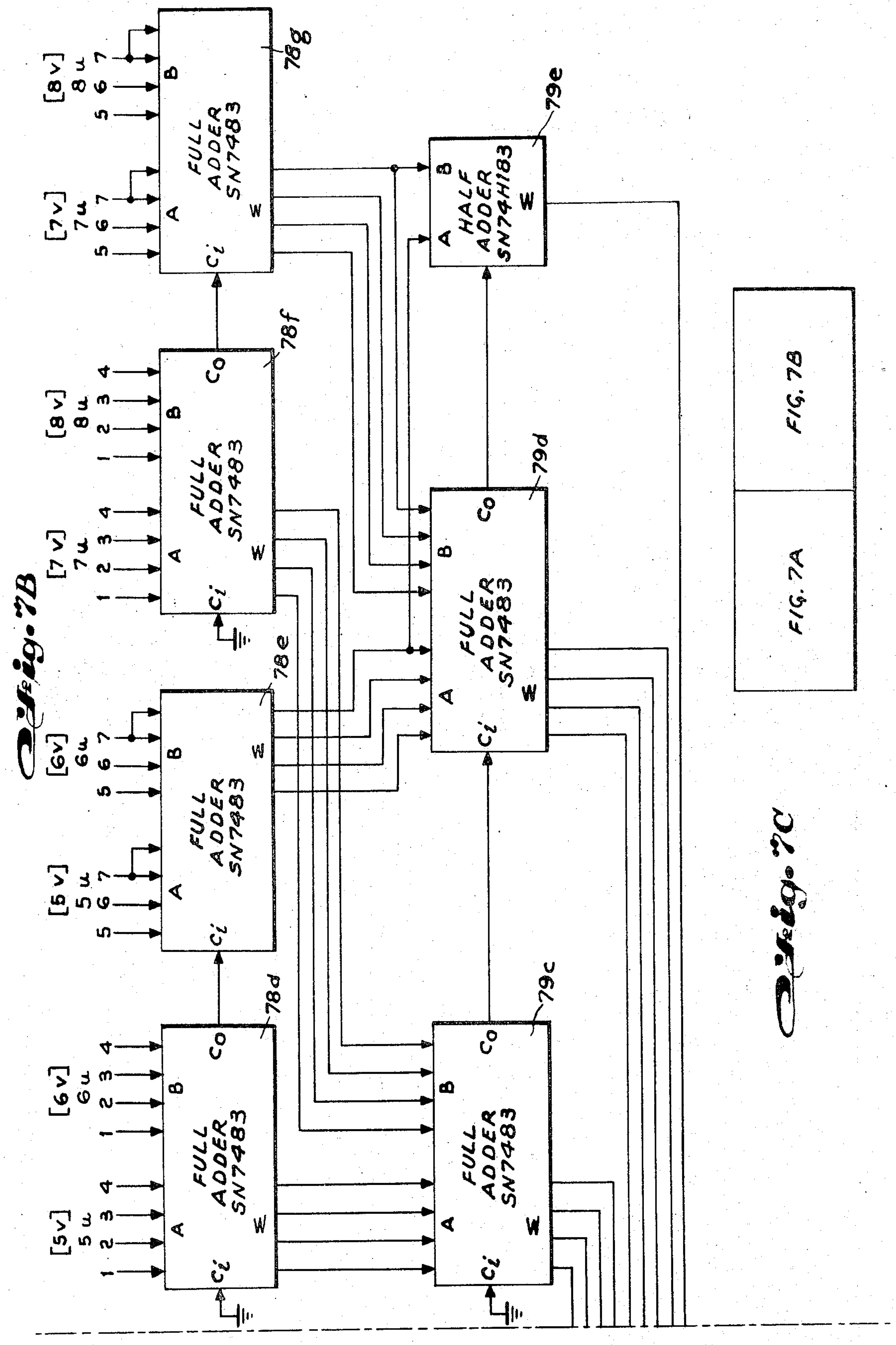

Referring to FIGS. 7A and 7B, when laid out as illustrated in FIG. 7C, there is disclosed therein one embodiment of the logic diagram of digital combiner circuit 11 (FIG. 1) capable of combining the inphase weighted digital signal and quadrature weighted digital signals from eight different diversity signal channels. In other words, N is equal to eight. For a two diversity system, where N is equal to two, only two of the full adders 78 and 78a would be employed rather than the three tiers of full adders as illustrated which is necessary to combine the signals in pairs at the input and output of the various tiers of adders until a single ten bit combined digital signal is obtained for each of the inphase and quadrature weighted digital signals. It will be noted in FIGS. 7A and 7B that there is indicated a U input for eight channels (the prefix numeral) and a letter V in brackets preceded by a numeral indicating the diversity channel involved. This designation is employed to illustrate that a duplicate of what is seen in FIGS. 7A and 7B would be employed to combine the quadrature weighted digital signals V from the eight different channels. The resultant output of this identical circuitry would be v which is shown in a bracket at the bottom of FIG. 7A illustrating the ten bits of the quadrature combined digital signals. As indicated, for an eight diversity channel combiner, full adders 78–78f are arranged in one tier of adders so that full adders 78 and 78a add the seven bits of the inphase weighted digital signals U for channels 1 and 2, full adders 78b and 78c will add the seven bits of the inphase weighted digital signals U for channels 3 and 4, full adders 78c and 78e will add the seven bits of inphase digital weighted signal U for diversity channels 5 and 6, and full adders 78f and 78g will add the seven bits of the inphase weighted digital data signal for diversity channels 7 and 8. A second tier of full adders 79–79e are arranged to combine the output of adders 78 in pairs as illustrated. A third tier of full adders 80–80b then operate on the output of adders 79 in pairs to produce the ten bit inphase combined digital signal u.

As mentioned hereinabove, the full adders operate using module-2 addition techniques. As mentioned hereinabove to obtain the quadrature combined digital signal v, the identical components shown in FIG. 7A and 7B will be employed but will have as its inputs the seven bit quadrature weighted digital signals V from each of the eight channels involved.

Figure 8A:
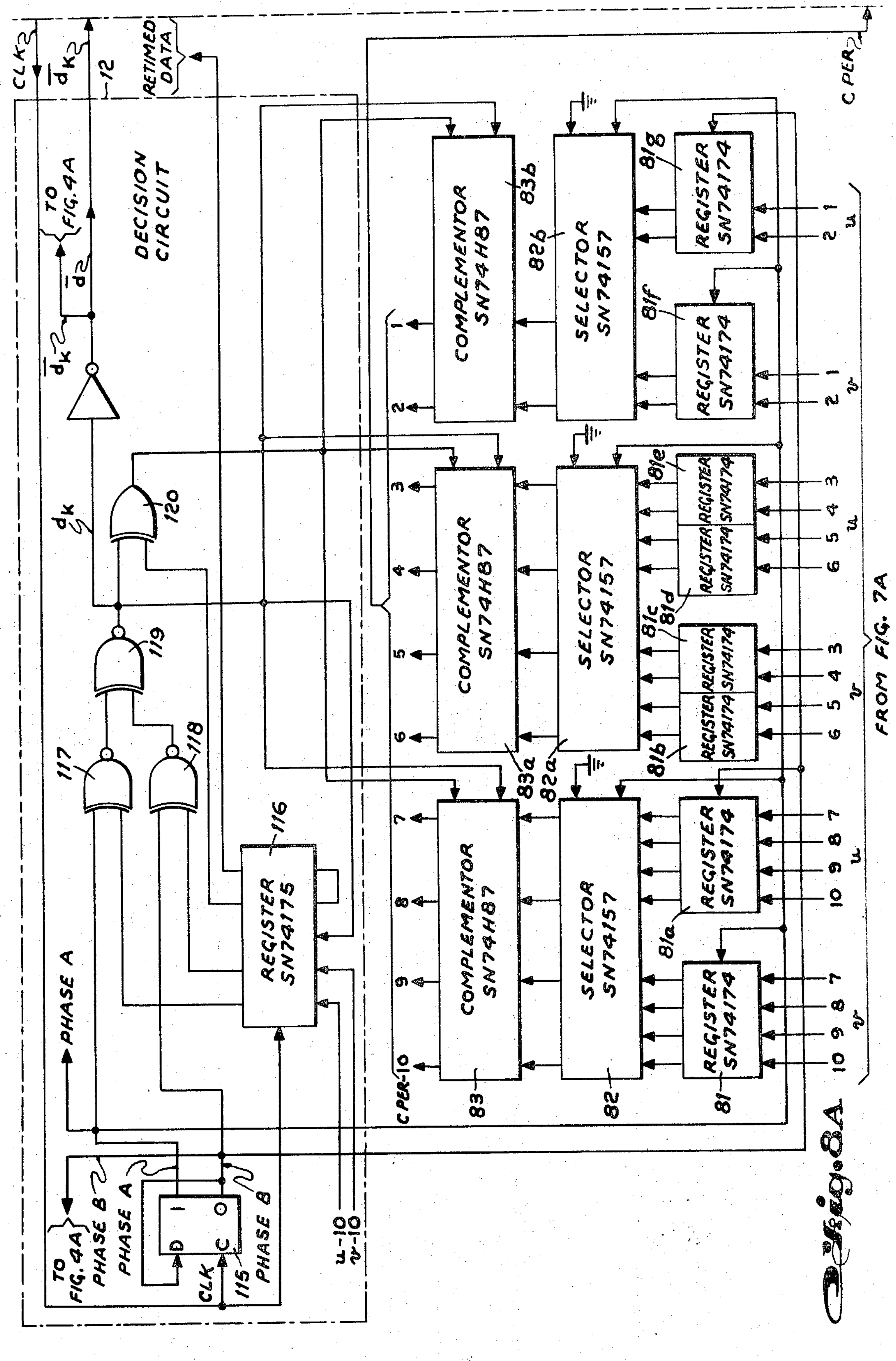
FIGS. 8A, 8B and 8C, when organized as illustrated in FIG. 8D, illustrates the logic diagram of one embodiment of the clock recovery circuit and decision circuit of FIG. 1.
Figure 8B:
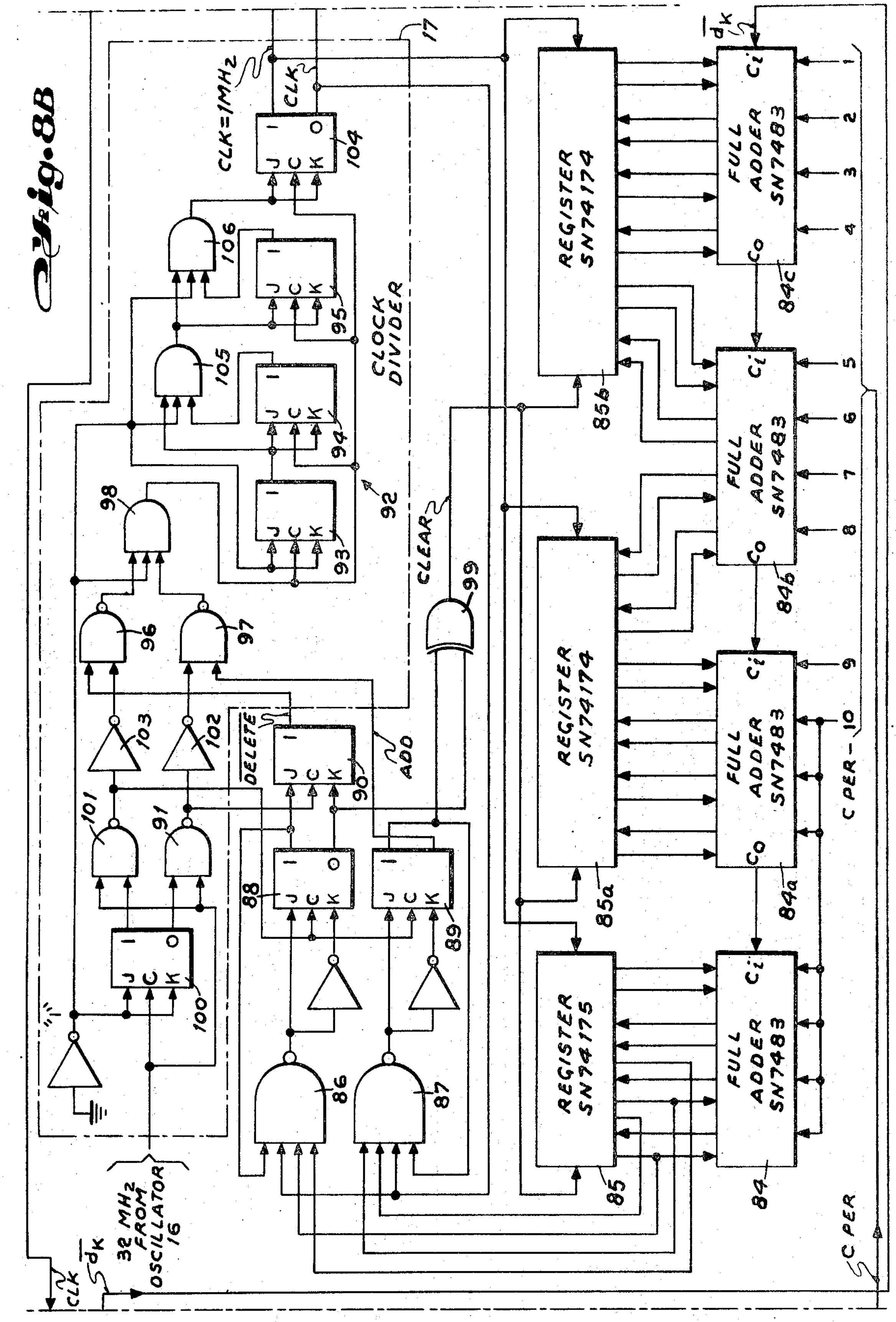
Figures 8C, 8D:
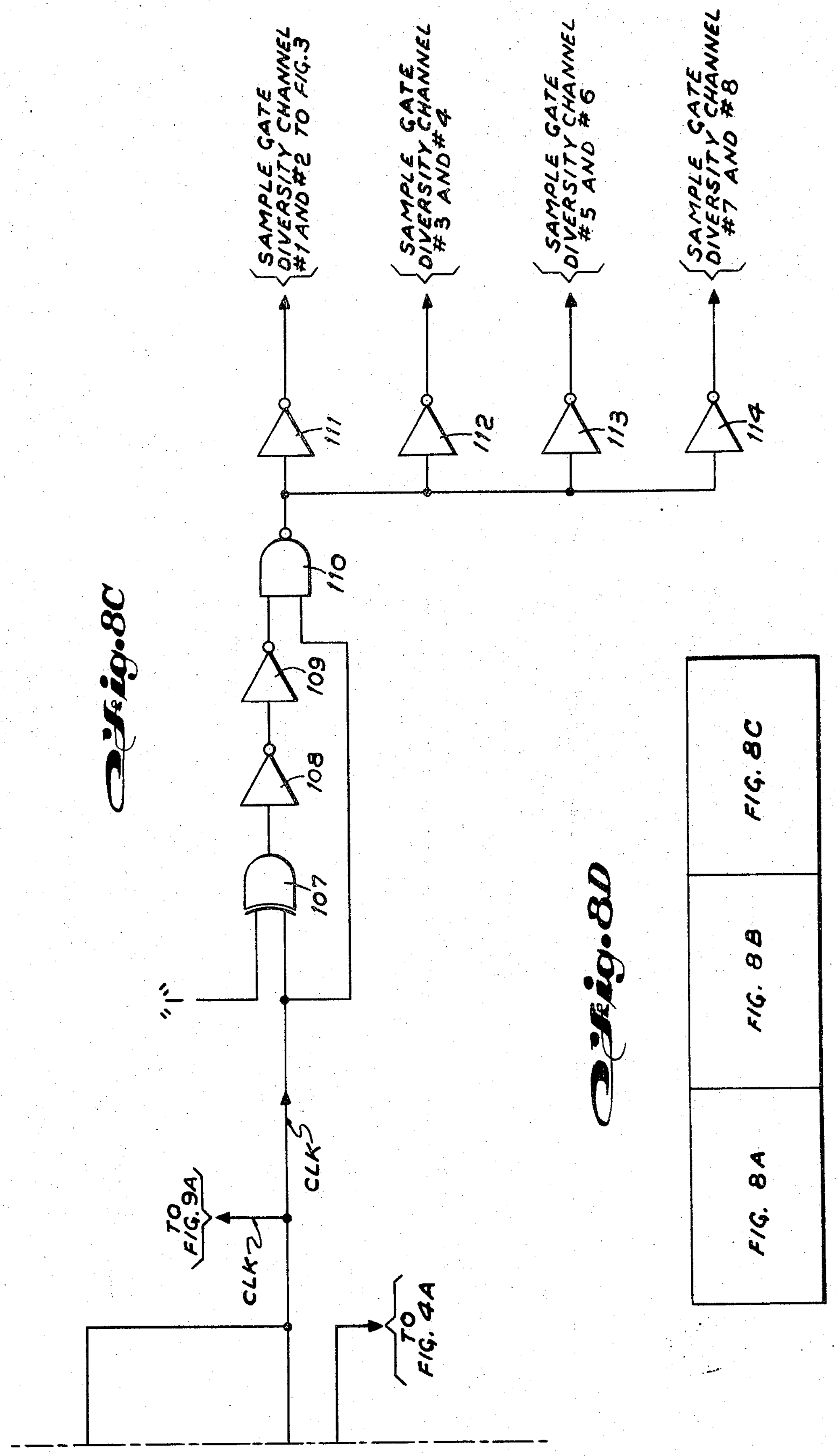

Referring to FIGS. 8A, 8B and 8C, organized as illustrated in FIG. 8D, there is disclosed therein one embodiment of the clock recovery circuit 13 (FIG. 1) including phase error generator and corrector circuit 15, clock divider 17 and decision circuit 12. The decision circuit 12 and circuit 17 are outlined by dotted line blocks and the remainder of the circuitry in FIGS. 8A and 8B are the error generator and correction circuit 15. The logic circuitry shown on FIG. 8C is the sample gate generator to produce the sample gates employed in the analog-to-digital converters of the demodulator units 7 of each of the N signal channels. The ten bits of the combined inphase and quadrature digital signals *u* and *v* are coupled to registers 81–81g which are under control of timing signals clock phase A and clock phase B as illustrated. The output of registers 81 are coupled to selectors 82–82b with these selectors being under control of timing signal clock phase A. The selected outputs from selectors 82 are coupled to complementers 83–83b which will provide the complement of the selected output or the true value of the selected output to produce the ten bit clock phase error digital word CPER. This error word CPER is coupled to full adders 84–84c and, hence, to registers 85-85b to form a 16 bit summer and accumulator with the registers being under control of the timing clock signal CLK and the module-2 full adders 84 being under control of the $\bar{d}_k$ output of decision circuit 12. The outputs from register 85 is a digital work that tells the remainder of the circuit whether to advance or retard the clock CLK. If an upper threshold is exceeded this means that the clock is too fast and, thus, a clock pulse or pulses must be deleted. This is accomplished by the circuitry including NAND gate 86, JK flip flop 88 clocked by the output of NAND gate 101 and JK flip flop 90 clocked by the output of NAND gate 91 provides a $\overline{\text{DELETE}}$ signal at the output of flip flop 90 which will delete one of the clock pulses being coupled to the divider 92 formed by three flip flops 93, 94 and 95 through NOR gate 96 and AND gate 98. NAND gates 91 and 101 are included as part of the clock divider 17. If a lower threshold is exceeded this means that the clock is too slow and thus a clock pulse must be added. This is accomplished by NAND gate 87, JK flip flop 89 clocked by the output of NAND gate 101, NAND gate 97 and AND gate 98. The outputs from flip flops 88 and 89 are coupled to EXCLUSIVE OR gate 99 which under proper conditions of the input signals applied thereto provides a clear signal for registers 85.

The clock timing signal CLK, for purposes of illustration, is 1 MHz. This 1 MHz CLK is provided by oscillator 16 having a 32 MHz frequency which is applied to the first stage of division formed by flip flop 100 which divide the 32 MHz signal to a 16 MHz signal. NAND gates 91 and 101 together with NOT gates 102 and 103 couples the resultant 16 MHz signals to NAND gates 96 and 97 to accomplish either deletion or addition of the desired clock pulse to properly phase the generated one megacycle clock. Divider 92 performs three more steps of division by factors of two and, thus, produce a 2 MHz signal. This signal is coupled to flip flop 104 under control of AND gates 105 and 106 to produce the properly phased 1 MHz clock signal CLK or the complement thereof $\overline{CLK}$.

The timing signal CLK is coupled through an EXCLUSIVE OR circuit 107 which is compared with a binary 1 input an then through NOT gates 108 and 109 and a NAND gate 110 under control of the signal CLK to produce the sampling gates for diversity channels 1 and 2, diversity channels 3 and 4, diversity channels 5 and 6 and diversity channels 7 and 8 through NOT gates 111,112, 113 and 114, respectively.

Decision circuit 12 receives the timing signal CLK which is applied to the clock input of a D-type flip flop 115 at whose output is provided the timing signals clock phase A and clock phase B for utilization in the decision circuit 12 as well as other indicated circuits of the inventive digital diversity combiner of the predetection maximal ratio type. Register 116 under control of the timing signal CLK receives the most significant bits (the sign bits) *u*-10 and *v*-10. The *a* and *b* outputs of register 116 are coupled to NAND gates 117 and 118 which are controlled, respectively, by clock phase A and clock phase B to recover the *a* and *b* data from the signal *s*. The data is recovered by the cooperatin of AND gate 119 and EXCLUSIVE-OR gate 120. The output of NAND gate 119 is coupled to complementers 83 of the clock phase error generator and also to the input of one stage of register 116. This one stage of register 116 is utilized to retime the recovered data at the output of NAND gate 119 and thereby produce the retimed data for further utilization. The retimed data from this one stage of register 116 is coupled to EXCLUSIVE-OR circuit 120 whose output is used as another input of the complementers 83 of the clock phase error generator to cooperate with the output of NAND gate 119 to tell the complementers 83 whether to pass the true or complement bits.

Figure 9A:
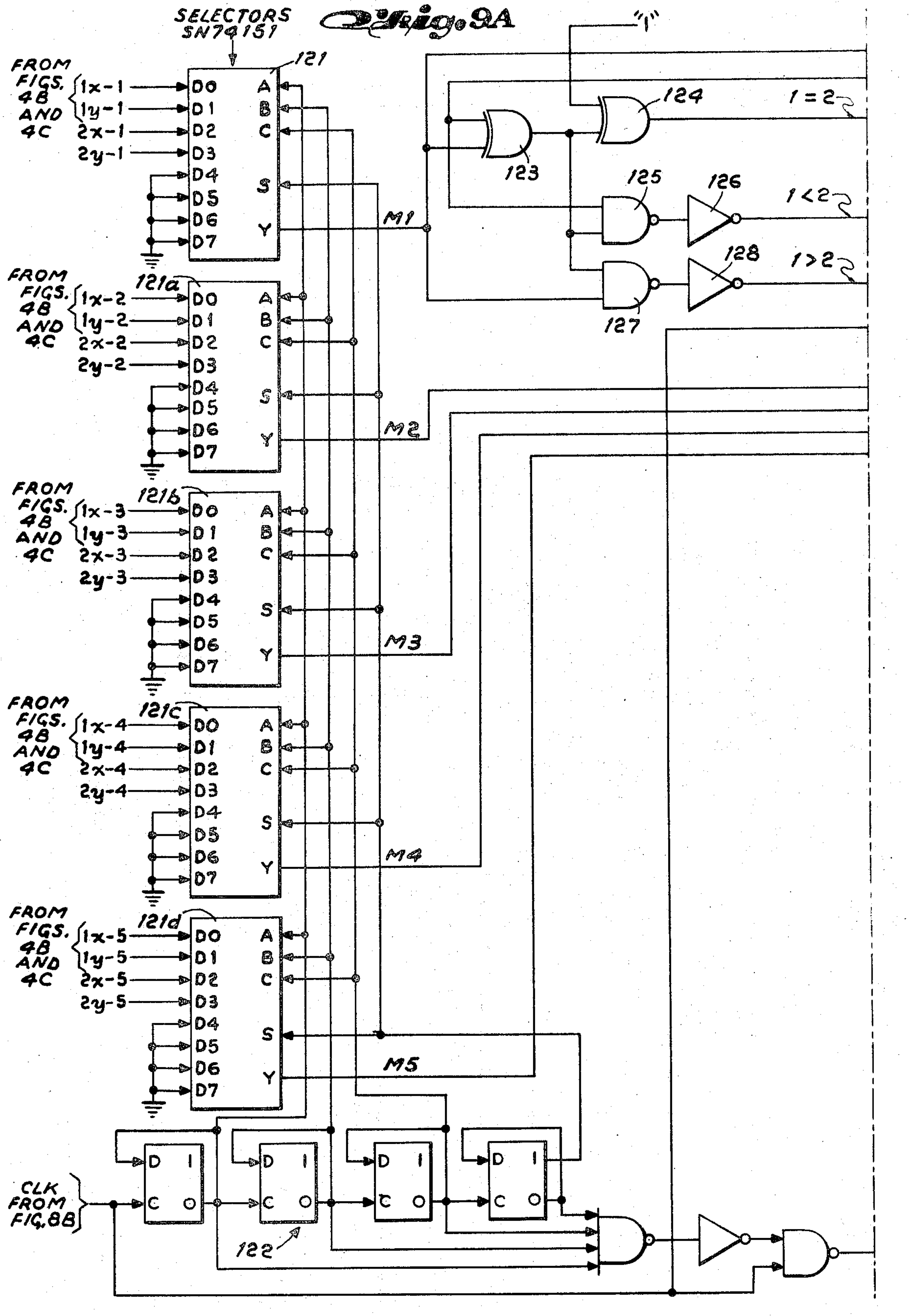
FIGS. 9A and 9B, when organized as illustrated in FIG. 9C, illustrates the logic diagram of one embodiment of the AGC circuit of FIG. 1 for two folds or channels of diversity.
Figures 9B, 9C:
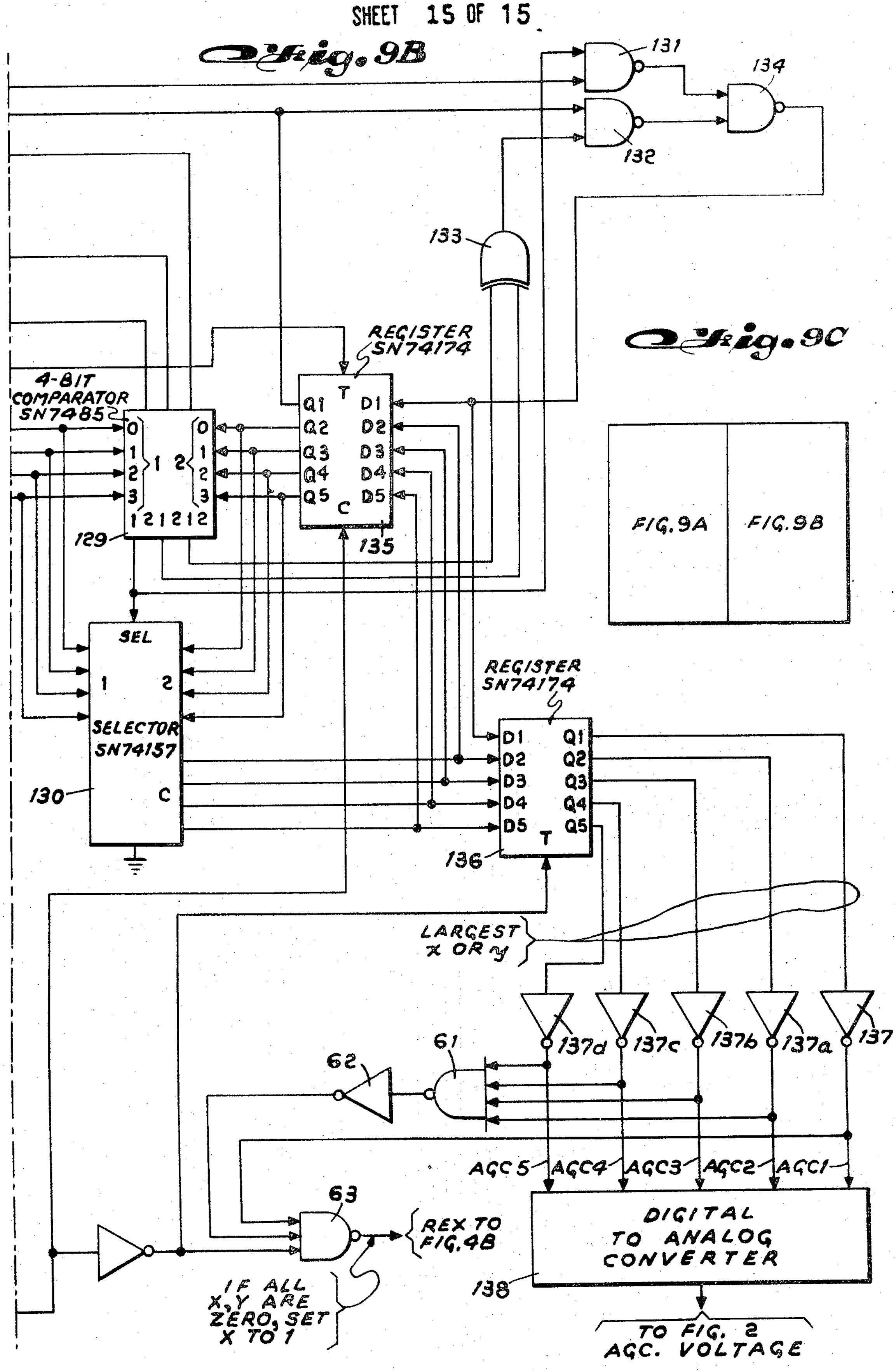

Referring to FIGS. 9A and 9B, when organized as illustrated in FIG. 9C, there is disclosed therein one embodiment of the logic diagram of the AGC circuit 14 (FIG. 1). The arrangement illustrated in FIGS. 9A and 9B are for determining the maximum *x* and maximum *y* of either of two diversity signal channels wherein the numeral preceding the *x* - bit number of *y* - bit number indicates the diversity channel 1 or 2. Using the techniques illustrated in FIGS. 9A and 9B it would be possible to expand the AGC circuit to accommodate more than two diversity channels, for instance, eight diversity channels. As illustrated in FIG. 9A the selectors 121 – 121*d* have four D inputs grounded. If these were ungrounded they could receive inputs of *x* and *y* bits from two other channels and to expand AGC circuit to operate on eight channels another bank of selectors 121 identical to the one illustrated would be added.

Selectors 121 are controlled from frequency divider 122 formed by four stages of D-type flip flops, the first of which is clocked by the timing signal CLK. The outputs of these four stages sequentially control selectors 121 – 121*d* to select the *x* and *y* bits of each of the first and second diversity channels to permit the remainder of the circuitry to determine which channel has the largest *x* or *y* weight value. The M1 output of selector 121 is used to determine whether the weight value of channel 1 is equal to the weight value of channel 2 through means of EXCLUSIVE-OR gates 123 and 124, whether the weight value of channel 1 is less than the weight value of channel 2 through means of NAND gate 125 and NOT gate 126, or whether the weight value of channel 1 is greater than the weight value of channel 2 through means of AND gate 127 and NOT gate 128. The three outputs from EXCLUSIVE-OR gate 124 and NOT gates 126 and 128 are used as control inputs to a four bit comparator 129. The M2 - M5 outputs of selectors 121*a*–121*d*, respectively, are provided as one set of inputs to comparator 125 and also as one set of inputs to selector 130. If comparator 129 provides an output at the terminal marked 1>2 this output will activate selector 130 and also provide an input to NAND gate 131 which together with NAND gate 132 and EXCLUSIVE-OR gate 133, which receives its inputs from the other two selector outputs 1 = 2 and 1<2 of comparator 129, will produce one of the inputs through NAND gate 134 to register 135. Register 135 stores therein the previous maximum value of *x* or *y* found by selectors 121 which sequentially look at the *x* and *y* values of each of channels in sequence. Register 135 provides another set of inputs for comparator 129. The comparator produces its control outputs on whether the quantity stored in register 135 is greater or less than quantity coupled from selectors 121*a*–121*d*. If the quantity previously selected and now stored in register 135 is greater than the quantity applied from selectors 121*a*–121*d*, then selector 130 will pass the output from register 135 to register 136 to provide the five bits for the digital AGC word through NOT gates 137.

If the value from selectors 121*a*–1219 is larger than that stored in registers 135, then selector 130 will pass the digits from selectors 121*a*–1219 to register 136 and, hence, through NOt gates 137 to provide the five bit AGC digital word.

The AGC digital word at the output of register 136 is the largest *x* or largest *y* of either one of the two channels in the illustration presented herein, or either one of the eight diversity channels to which the arrangement of FIGS. 9A and 9B can be expanded. The resultant AGC five bit digital word is then coupled to a digital-to-analog converter 138 to convert the digital word to an AGC voltage which then is coupled to the IF amplifiers 19 of the demodulator unit 7 of each of the diversity signal channels.

As previously mentioned with respect to FIG. 4B, AND gate 61, NOT gate 62 and NAND gate 63 produces a setting signal REX if all the x or all the y digits are binary 0 at the output of NOT gates 137. If this condition is present then the REX signal is produced which will set the x bits produced in the circuit as illustrated in FIG. 4B to binary 1 which will start the operation of the digital combiner arrangement of the present invention.

With reference to the logic diagrams of FIGS. 3–9, certain of the blocks incorporate therein a number prefixed by the letters SN. These numbers prefixed by the letters SN identifies that particular integrated circuit component manufactured by Texas Instruments, Inc. that has been employed in a reduction to practice of the digital combiner circuit of the present invention. The specifications and characteristics of operation of each of the blocks having the SN number designation are fully described in the "Integrated Circuit Catalog for Design Engineers," First Edition, published by Texas Instruments, Inc.

While we have described above the principles of our invention in connection with specific apparatus it is to be clearly understood that this description is made only by way of example and not as a limitation to the scope of our invention as set forth in the objects thereof and in the accompanying claims.

We claim:

1. A predetection maximal ratio digital diversity combiner for a phase shift keyed digital data signal propagating on N different paths through a dispersive medium,where N is an integer greater than one, comprising:
N signal channels, each of said channels responding to said data signal propagating on a different one of said N different paths;
each of said channels including
first means to separate said data signal into an inphase component and a quadrature component, and
second means coupled to said first means to convert said inphase component into an inphase digital signal and said quadrature component into a quadrature digital signal;
third means coupled in common to the output of each of said channels to digitally add said inphase digital signal of each of said channels together to produce a combined inphase digital signal and to digitally add said quadrature digital signal of each of said channels together to produce a combined quadrature digital signal;
fourth means coupled to said third means responsive to said combined inphase digital signal and said combined quadrature digital signal to recover the data conveyed by said data signal;
each of said channels further including
fifth means coupled between said second means and said third means and to said fourth means responsive to said recovered data to weight said inphase digital signal and said quadrature digital signal prior to digitally adding thereof in said third means; and
sixth means coupled to said fifth means of each of said channels to produce an automatic gain control signal for control of the gain of said data signal in each of said channels.

2. A combiner according to claim 1, wherein
said N different paths are provided by a space diversity system.

3. A combiner according to claim 1, wherein
said N different paths are provided by an angle diversity system.

4. A combiner according to claim 1, wherein
data conveyed by said data signal includes
a 90° carrier phase increase for each binary "1" data bit, and
a 90° carrier phase decrease for each binary "0" data bit.

5. A combiner according to claim 1, wherein
said data signal propagating on said N different paths includes
a carrier having a given RF frequency; and
each of said N channels further including
a down converter coupled between the associated one of said N different paths and the associated one of said first means to convert said carrier having a given RF frequency to a carrier having a given IF frequency.

6. A combiner according to claim 1, wherein
each of said first means includes
a first balanced mixer coupled to the associated one of said N different paths,
a second balanced mixer coupled to said associated one of said N different paths,
an oscillator having a frequency equal to the carrier frequency of said data signal, said oscillator being directly connected to said first mixer, and
a 90° phase shifter coupled between said oscillator and said second mixer,
said first mixer producing said inphase component and said second mixer producing said quadrature component.

7. A combiner according to claim 1, wherein
each of said second means includes
a first analog-to-digital converter coupled to said first means responsive to said inphase component to produce said inphase digital signal, and
a second analog-to-digital converter coupled to said first means responsive to said quadrature component to produce said quadrature digital signal.

8. A combiner according to claim 1, wherein
said third means includes
a first digital adder arrangement coupled to said output of each of said channels to produce said combined inphase digital signal, and
a second digital adder arrangement coupled to said output of each of said channels to produce said combined quadrature digital signal.

9. A combiner according to claim 8, wherein
N is equal to an even integer,
said first digital adder arrangement includes
a first tier of digital adders to add said inphase digital signals of each of said channels in pairs,
a second tier of digital adders coupled to said first tier of digital adders to add the resultant output signals of each of said first tier of digital adders in pairs, and
additional tiers of digital adders coupled to the preceding tier of digital adders to add the resultant output signals of each of said preceding tier of digital adders until said combined inphase digital signal is produced, and
said second digital adder arrangement includes
a plurality of tiers of digital adders arranged and functioning identical to said first, second and additional tiers of digital adders but operating on said quadrature digital signal to produce said combined quadrature digital signal.

10. A combiner according to claim 1, wherein
said fourth means includes
a digital decision circuit coupled to said third means responsive to the most significant bit of both said combined inphase digital signal and said combined quadrature digital signal to recover said data conveyed by said data signal, and
a digital clock recovery circuit coupled to said third means and said decision circuit responsive to said combined inphase digital signal, said combined quadrature digital signal and said recovered data to generate a bit rate clock in phase with the bit rate of said data signal and to produce a plurality of timing signals to control the operation of said decision circuit,each of said second means and each of said fifth means.

11. A combiner according to claim 1, wherein each of said fifth means include first logic circuitry coupled to said fourth means and said second means responsive to said inphase and quadrature digital signals and said recovered data to compensate for carrier phase shift in said inphase and quadrature digital signals, second logic circuitry coupled to said first logic circuitry responsive to said compensated inphase and quadrature digital signals to determine the maximal ratio weights of said inphase and quadrature digital signals, and third logic circuitry coupled to said second means and said second logic circuitry to weight said inphase and quadrature digital signals according to said determined maximal ratio weights.

12. A combiner according to claim 11, wherein said second logic circuitry includes a first digital averaging circuit coupled to said first logic circuitry to digitally average said compensated inphase digital signal to determine the maximal ratio weight of said inphase digital signal and to produce a first digital weight signal representing said determined maximal ratio weight of said inphase digital signal, and a second digital averaging circuit coupled to said first logic circuitry to digitally average said compensated quadrature digital signal to determine the maximal ratio weights of said quadrature digital signal and to produce a second digital weight signal representing said determined maximal weight of said quadrature digital signal.

13. A combiner according to claim 12, wherein said third logic circuitry includes a first digital arrangement coupled to said second means and said first and second averaging circuits to multiply each bit of said inphase and quadrature digital signals with each bit of said first and second digital weight signals according to a first predetermined pattern and to produce therefrom said weighted inphase digital signal ,and a second digital arrangement coupled to said second means and said first and second averaging circuits to multiply each bit of said inphase and quadrature digital signals with each bit of said first and second digital weight signal according to a second predetermined pattern different than said first pattern and to produce therefrom said weighted quadrature digital signal.

14. A combiner according to claim 12, wherein said sixth means includes seventh means coupled to said first and second averaging circuit of each of said N channels to determine which of said channels contains the maximum of said weight signals, and eighth means coupled to said seventh means to produce an automatic gain control voltage from said determined maximum weight signals.

15. A combiner according to claim 14, wherein said seventh means includes a digital selector means coupled to said first and second averaging circuit of each of said N channels to select sequentially one of said first and second weight signals of each of said N channels, a digital register to store the previous maximum one of said first and second weight signals of one of said N channels, and a digital comparator coupled to the output of said selector means, the output of said register and the input of said register to compare the present selected one of said first and second weight signals of one of said N channels with that one of said first and second weight signals of one of said N channels stored in said register and to couple the maximum one of said compared weight signals to the input of said register and to said eighth means.

16. A combiner according to claim 15, wherein said eighth means includes a digital-to-analog converter coupled to said comparator to convert said maximum one of said compared weight signals to an automatic gain control voltage.

17. A combiner according to claim 1, wherein said data signal propagating on said N different paths including a carrier having a given RF frequency;

each of said N channels further includes a down converter coupled between the associated one of said N different paths and the associated one of said first means to convert said carrier having a given RF frequency to a carrier having a given IF frequency;

each of said first means includes a bandpass filter coupled to the associated one of said down converters, an IF amplifier coupled to said band pass filter, a first balanced mixer coupled to said IF amplifier, a second balanced mixer coupled to said IF amplifier, an oscillator having a frequency equal to said given IF frequency, said oscillator being directly connected to said first mixer, and a 90° phase shifter coupled between said oscillator and said second mixer, said first mixer producing said inphase component and said second mixer producing said quadrature component; each of said second means includes a first low pass filter coupled to the associated one of said first mixers, a second low pass filter coupled to the associated one of said second mixers, a first analog-to-digital converter coupled to said first low pass filter responsive to said inphase component to produce said inphase digital signal, and a second analog-to-digital converter coupled to said second low pass filter responsive to said quadrature component to produce said quadrature digital signal;

said third means includes a first digital adder arrangement coupled to said output of each of said channels to produce said combined inphase digital signal, and a second digital adder arrangement coupled to said output of each of said channels to produce said combined quadrature digital signal;

said fourth means includes a digital decision circuit coupled to said first and second digital adder arrangements responsive to the most significant bit of both of said combined inphase digital signal and said combined quadrature digital signal to recover said data conveyed by said data signal, and a digital clock recovery circuit coupled to said first and second digital adder arrangements and said decision circuit responsive to said combined inphase digital signal, said combined quadrature digital signal and said recovered data to generate a bit rate clock in phase with the bit rate of said data signal and to produce a plurality of timing signals to control the operation of said decision circuit , each of said first analog-to-digital converters, each of said second analog-to-digital converters and each of said fifth means;

each of said fifth means include first logic circuitry coupled to said decision circuit and the associated one of said analog-to-digital converters responsive to said inphase and quadrature digital signals and said recovered data to compensate for carrier phase shift in said inphase and quadrature digital signals, second logic circuitry coupled to said first logic circuitry responsive to said compensated inphase and quadrature digital signals to determine the maximal ratio weights of said inphase and quadrature digital signals, and third logic circuitry coupled to said associated one of said first and second analog-to-digital converters and said second logic circuitry to weight said inphase and quadrature digital signals according to said determined maximal ratio weights; and said sixth means includes seventh means coupled to said second logic circuitry of each of said N channels to determine which of said channels contains the maximum of said determined maximal ratio weights,and eighth means coupled to said seventh means to produce an automatic gain control voltage from said maximum determined maximal ratio weights for coupling to each of said IF amplifier.

* * * * *